(12) United States Patent
Jenkins et al.

(10) Patent No.: US 8,663,528 B2
(45) Date of Patent: Mar. 4, 2014

(54) CATERPILLAR TRACTION APPARATUS

(76) Inventors: Peter David Jenkins, Framlingham (GB); Daniel Owen Jenkins, Framlingham (GB)

( * ) Notice: Subject to any disclaimer, the term of this patent is extended or adjusted under 35 U.S.C. 154(b) by 174 days.

(21) Appl. No.: 12/950,763

(22) Filed: Nov. 19, 2010

(65) Prior Publication Data

US 2011/0120836 A1    May 26, 2011

Related U.S. Application Data

(62) Division of application No. 10/502,230, filed as application No. PCT/GB03/00273 on Jan. 24, 2003, now abandoned.

(30) Foreign Application Priority Data

Jan. 26, 2002    (GB) .................................. 0201793.7

(51) Int. Cl.
   *B65H 51/14*    (2006.01)
(52) U.S. Cl.
   USPC ........... 264/280; 425/371; 425/372; 425/392; 156/555; 156/583.1; 156/583.5; 100/151; 100/152; 100/153; 100/154
(58) Field of Classification Search
   USPC .................. 425/371, 372, 392; 100/151–154; 156/555, 583.1, 583.5; 264/280
   See application file for complete search history.

(56) References Cited

U.S. PATENT DOCUMENTS

| 744,039 A | 11/1903 | Brown |
| 978,077 A | 12/1910 | Travis |
| 1,105,036 A | 7/1914 | Mukautz |
| 2,368,637 A | 2/1945 | Bruenner et al. |
| 3,065,893 A * | 11/1962 | Basford ........................ 226/172 |
| 3,610,500 A | 10/1971 | Brown |
| 3,721,809 A | 3/1973 | Strandberg et al. |
| 3,736,081 A * | 5/1973 | Yovanovich ................... 425/4 C |
| 3,779,686 A * | 12/1973 | Kerttula et al. ............... 425/371 |
| 3,880,274 A | 4/1975 | Bechtloff et al. |
| 3,966,379 A * | 6/1976 | O'Brien ........................ 425/327 |
| 4,118,179 A | 10/1978 | Ballinger |
| 4,128,369 A * | 12/1978 | Kemerer et al. .............. 425/113 |
| 4,283,246 A * | 8/1981 | Held ............................. 156/555 |
| 4,311,550 A * | 1/1982 | Kerttula ........................ 156/555 |
| 4,410,474 A * | 10/1983 | Ahrweiler ..................... 264/109 |

(Continued)

FOREIGN PATENT DOCUMENTS

| CA | 1161385 | 1/1984 |
| DE | 19651904 | 6/1998 |

(Continued)

OTHER PUBLICATIONS

Transmittal of International Preliminary Examination Report for PCT/GB03/00273 dated Sep. 4, 2003.

(Continued)

*Primary Examiner* — Christina Johnson
*Assistant Examiner* — Saeed Huda
(74) *Attorney, Agent, or Firm* — Cook Alex Ltd.

(57) ABSTRACT

A caterpillar traction apparatus (110), wherein two pairs of pulleys (122 & 123, 132 & 133) can be driven at different speeds, so that the linear member (40) being driven by the mechanism is subjected to either compression or extension forces.

4 Claims, 3 Drawing Sheets

(56) References Cited

U.S. PATENT DOCUMENTS

| | | | |
|---|---|---|---|
| 4,541,889 A * | 9/1985 | Held | 156/583.5 |
| 4,620,409 A | 11/1986 | McElvy | |
| 4,743,334 A * | 5/1988 | Singer | 156/499 |
| 5,368,212 A | 11/1994 | Koch | |
| 5,412,853 A | 5/1995 | Catallo | |
| 6,244,846 B1 | 6/2001 | Keller | |
| 6,543,767 B1 | 4/2003 | Krouse | |
| 2001/0023884 A1 | 9/2001 | Hasegawa et al. | |
| 2005/0212173 A1 * | 9/2005 | Swanson | 264/280 |
| 2006/0068053 A1 * | 3/2006 | Brandt et al. | 425/371 |
| 2008/0018014 A1 * | 1/2008 | Bosler | 264/210.2 |

FOREIGN PATENT DOCUMENTS

| | | |
|---|---|---|
| EP | 0234125 | 9/1987 |
| EP | 0328682 | 8/1989 |
| EP | 07652314 | 5/2000 |
| EP | 1035354 | 9/2000 |
| FR | 2425384 | 12/1868 |
| GB | 1101735 | 1/1968 |

OTHER PUBLICATIONS

International Search Report for PCT/GB03/00273 dated Jun. 4, 2003.

* cited by examiner

SECTION A A

CATERPILLAR TRACTION APPARATUS

CROSS-REFERENCED TO RELATED APPLICATIONS

This application is a divisional of U.S. application Ser. No. 10/502,230, filed Jul. 19, 2005 which is the National Stage under 35 U.S.C. §371 of International Application No. PCT/GB03/00273 filed on Jan. 24, 2003 which claims priority from British Application GB 0201793.7 filed Jan. 26, 2002. The entire disclosures of these applications are incorporated herein by reference in their entireties.

This invention relates to the field of caterpillar traction apparatuses.

Caterpillar traction apparatus are commonly used in the manufacturing industry to transport products along assembly lines and from one stage in the manufacturing process to the next. In particular, the cable manufacturing industry uses caterpillar traction apparatus to transport extruded plastic tubes and other cable elements between different pieces of equipment, for example between an extruder and a stranding machine.

According to a first aspect of the invention there is provided a caterpillar traction apparatus comprising first and second extensible traction members, the first traction member being driven by and entrained around first and second rotatable members and the second traction member being driven by and entrained around third and fourth rotatable members, each of the rotatable members being addressed by drive means such that the first and third rotatable members can be driven at a first speed and the second and fourth rotatable members can be driven at a second speed, the first speed not being equal to the second speed.

The difference between the first speed and the second speed may be between 1% and 10%, and in particular the difference between the first speed and the second speed may be 4%. The second speed may be less than the first speed or alternatively the second speed may be greater than the first speed. The first and second extensible traction members may be extended in a direction significantly parallel to their direction of motion and/or the first and second extensible traction members may be extended in a direction significantly perpendicular to their direction of motion.

The first and second extensible traction members are preferably capable of sustained extensions of 10% or greater, and they may comprise rubber and/or a compressible polymer.

According to a second aspect of the invention there is provided a method of processing a linear member within a caterpillar traction apparatus according to the first aspect, wherein the processing of the linear member is effected by the difference between the first speed and the second speed. The difference between the first speed and the second speed may compress linearly the linear member or alternatively the difference between the first speed and the second speed may extend linearly the linear member.

The invention will now be described, by way of example only, with reference to the following Figures in which:

FIG. 4b is a section taken along line A-A of FIG. 4a.

Figure 1:
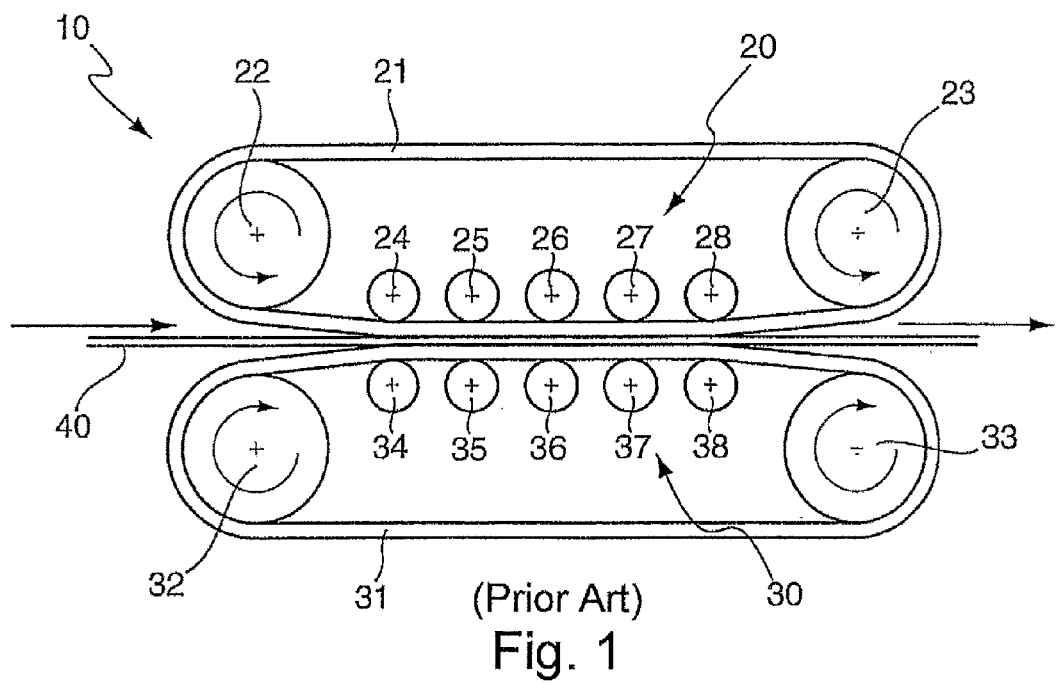
FIG. 1 shows a schematic depiction of a known caterpillar traction mechanism.

FIG. 1 shows a schematic depiction of a known caterpillar traction apparatus. The caterpillar traction apparatus 10 comprises an upper half 20 and a lower half 30 that co-operate to advance a linear member 40, such as an extruded tube, pipe or cable.

The upper half 20 comprises a first belt 21, first and second pulleys 22, 23 and a plurality of compression rollers 24, 25, 26, 27, 28. The first belt 21 is substantially un-extended under the tensile loads experienced during normal operation of the apparatus 10.

Typically such belts have a soft rubber outer layer in order to increase the grip on the linear member 40 being driven by the apparatus and comprise a substantially inextensible strength member, for example, woven aramid fibres or braided steel, in the centre of the belt, to provide the belt's capacity to resist extension. The belt may also have a tread pattern on its inner surface to increase the traction between the first belt and the first and second pulleys.

The first pulley 22 is a driven pulley, which is in driveable connection with a motor (not shown) whilst second pulley 23 is an idle pulley. The compression rollers 24-28 are free to rotate but act to urge the first belt against the linear member 40, thereby increasing the grip between the first belt and the linear member.

The lower half is of a similar construction to the upper half and comprises a second belt 31, third and fourth pulleys 32, 33 and a plurality of compression rollers 34, 35, 36, 37, 38. The second belt 31 is substantially un-extended under the tensile loads experienced during normal operation of the apparatus 10 and has a similar construction and performance to the first belt (see above)

The third pulley 32 is a driven pulley, which is in driveable connection with a motor (not shown) whilst fourth pulley 33 is an idle pulley. The compression rollers 34-38 are free to rotate but act to urge the second belt against the linear member 40.

The traction apparatus advances the linear member by the action of the motor causing the first pulley 22 to rotate in a counter-clockwise direction and the third pulley 32 to rotate in a clockwise direction. The two sets of compression rollers work in combination to improve the grip of the first and second belts on the linear member, increasing the efficiency with which the linear member is moved by the traction apparatus.

Figure 2:
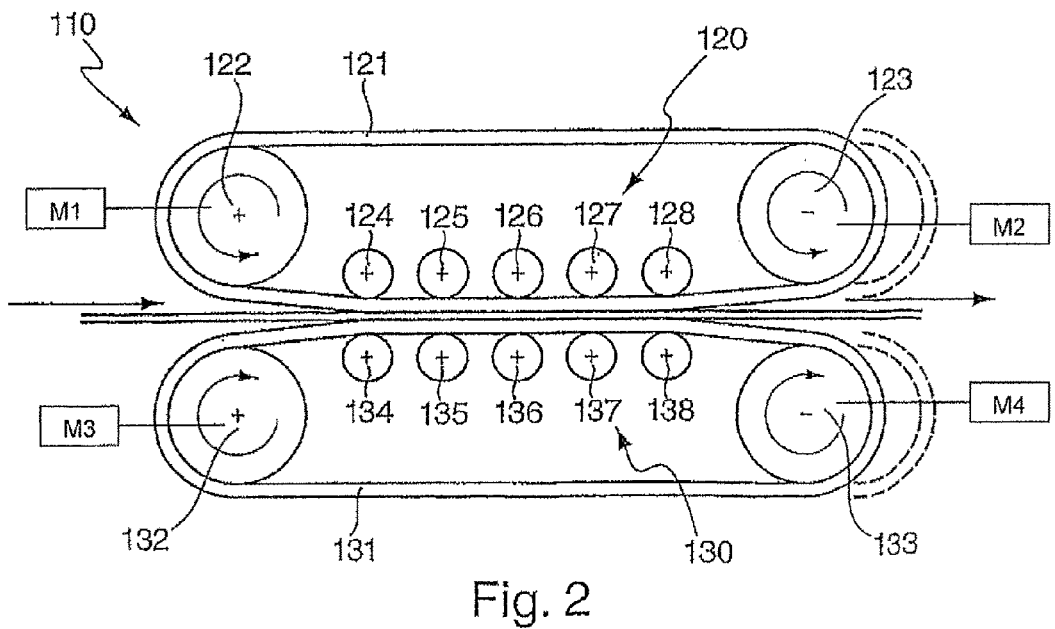
FIG. 2 shows a schematic depiction of a caterpillar traction mechanism according to the present invention.

FIG. 2 shows a caterpillar traction apparatus according to the present invention, which comprises an upper half 120 and a lower half 130 that co-operate to advance a linear member 40, such as an extruded tube, pipe or cable. The upper half 120 comprises a first belt 121, first and second pulleys 122, 123 and a plurality of compression rollers 124, 125, 126, 127, 128. The first belt 121 has a soft rubber outer layer in order to increase the grip on the linear member 40 being driven by the apparatus and a tread pattern on the inner surface to increase the traction between the first belt and the first and second pulleys. Both the first pulley 122 and the second pulley 123 are driven pulleys, which have a respective driveable connection with a motor M1 and M2, respectively. The compression rollers 124-128 are free to rotate but act to urge the first belt against the linear member 40.

The lower half is of a similar construction to the upper half and comprises a second belt 131, third and fourth pulleys 132, 133 and a plurality of compression rollers 134, 135, 136, 137, 138. The second belt 131 has a soft rubber outer layer and a tread pattern on its inner surface, in a similar manner to the first belt. The third pulley 132 and fourth pulley 133 are driven pulleys, which have a respective driveable connection with a motor M3 and M4, respectively. The compression rollers 134-138 are free to rotate but act to urge the second belt against the linear member 40. Both sets of compression rollers, 124-128 & 134-138 act in a direction that is substantially normal to the linear member being passed through the apparatus In contrast to the known arrangement described above and shown in FIG. 1, both the first and second belts 121, 131 are elastic and are capable of sustaining a significant elongation, for example of 10-15%. Additionally, the second and fourth pulleys 123, 133 can be moved parallel to the axis of the linear member to stretch the first and second belts respectively.

The traction apparatus 110 according to the present invention can be used to linearly compress a linear member 40 as it passes through the apparatus. The second and fourth pulleys are moved so as to extend the first and second belts into the positions indicated by the dotted lines in FIG. 2. This strains the first and second belts, giving an extension of, for example, 5%. The belts are then rotated by driving each of the pulleys. The first and second pulleys 122, 123 are both driven in a counter-clockwise direction and the third and fourth pulleys 132, 133 are driven in a clockwise direction. The second and fourth pulleys 123, 133 are driven at a lower speed than are the first and third pulleys 122, 132, for example 4% slower than the first and third pulleys. Each pulley may have a dedicated motor and drive circuitry, all of which are controlled centrally, or the apparatus may have a single motor that is connected to each pulley via respective gearings and drive circuitry.

This differential speed for the two sets of pulleys means that the first and second belts will be subject to different levels of strain in different regions of each belt. In the 'interior portion' of the two belts, where the first belt is advanced from the first pulley to the second pulley and the second belt is advanced from the third pulley to the fourth pulley, the first and second belts are relaxed by 4% due to the speed differential, leaving the belts strained at 1%. Similarly, in the 'exterior portion' of the two belts, where the first belt is returned from the second pulley to the first pulley and the second belt is returned from the fourth pulley to the third pulley, the first and second belts are strained by a further 4%, giving a 9% strain in the 'exterior portion' of the first and second belts.

As the linear member passes through the apparatus it is pulled into the apparatus by the first and second pulleys at a speed that is 4% greater than the speed at which the third and fourth pulleys are driving the linear member out of the apparatus. Thus, the linear member is subjected to a 4% compression whilst it is being driven through the apparatus. If necessary, the force applied by the compression rollers can be increased to reduce the possibility that the compressive forces induce buckling in the linear member.

By compressing the linear member the linear member can be conditioned by reducing the level of strain energy stored within the member. This strain energy is incorporated within the linear member during extrusion (or other manufacturing processes). The reduction of the stored strain energy reduces the potential for the linear member to relax. This is advantageous because it makes the subsequent storage and processing of the linear member more simple. Any such relaxation could cause an undesired change in length of the linear member, during future temperature or other environmental changes. This is of advantage when used with the tube processing equipment described in our European patent EP-B-0 765 214.

Furthermore, the apparatus of the present invention can be operated in a different manner to provide a tensile strain on the linear member, rather than a compressive strain, as it is driven through the apparatus.

To provide a tensile strain it is necessary to drive the second and fourth pulleys faster than the first and third pulleys, such that the 'interior portion' of the two belts experiences a greater strain than the 'exterior portion' of the two belts, causing the linear member to be pulled out of the apparatus by the second and fourth pulleys at a greater speed than it is driven into the apparatus by the first and third pulleys. The advantage of subjecting the linear member to a tensile strain is that polymer chains in an extruded tube can obtain a greater degree of orientation, leading to an increased tensile strength.

From the foregoing discussion it will be apparent that the capacity of the apparatus to apply compression (or extension) to a linear member is determined by the amount of strain that the first and second belts can withstand, and the frictional grip between the belts and the driven pulleys. Known belts for caterpillar apparatus are designed to operate without undergoing significant extension, as the energy that is used to extend the belts is lost from the primary purpose of the caterpillar, that is transporting an item. For example, a typical known belt for a caterpillar apparatus would have a normal working strain range of 2-5% with an ultimate tensile strain of 10%. For the present invention it is envisaged that the extensible belts would have a normal working strain range of 10-20% with a much greater ultimate tensile strain value.

Figure 3:
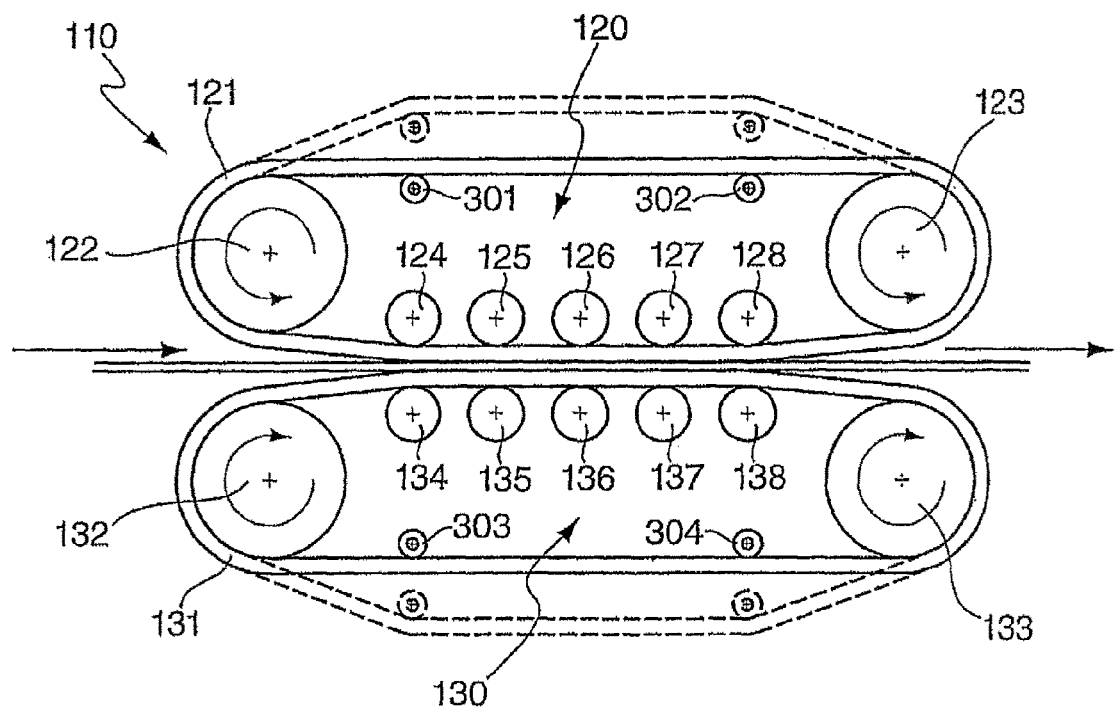
FIG. 3 shows an alternative embodiment of schematic depiction of a caterpillar traction mechanism according to the present invention.

FIG. 3 shows an alternative embodiment of the present invention, in which the second and fourth pulleys are not moved to extend the belts. Instead, the belts are extended by providing a plurality of rollers 300, 301, 302 & 303. The rollers are free to rotate and can be moved outwards (as shown in FIG. 3) in order to extend the belts. The rollers are mounted on sliding blocks which comprise tensioning members such that the blocks can be secured in position. The degree of belt extension will increase with the distance that the rollers are moved from their initial positions. The position of the extended belts are shown using broken lines in FIG. 3. It will be understood that that the method of extending the belts described in relation to FIG. 2 could be combined with the method of extending the belts described in relation to FIG. 3.

Figure 4A:
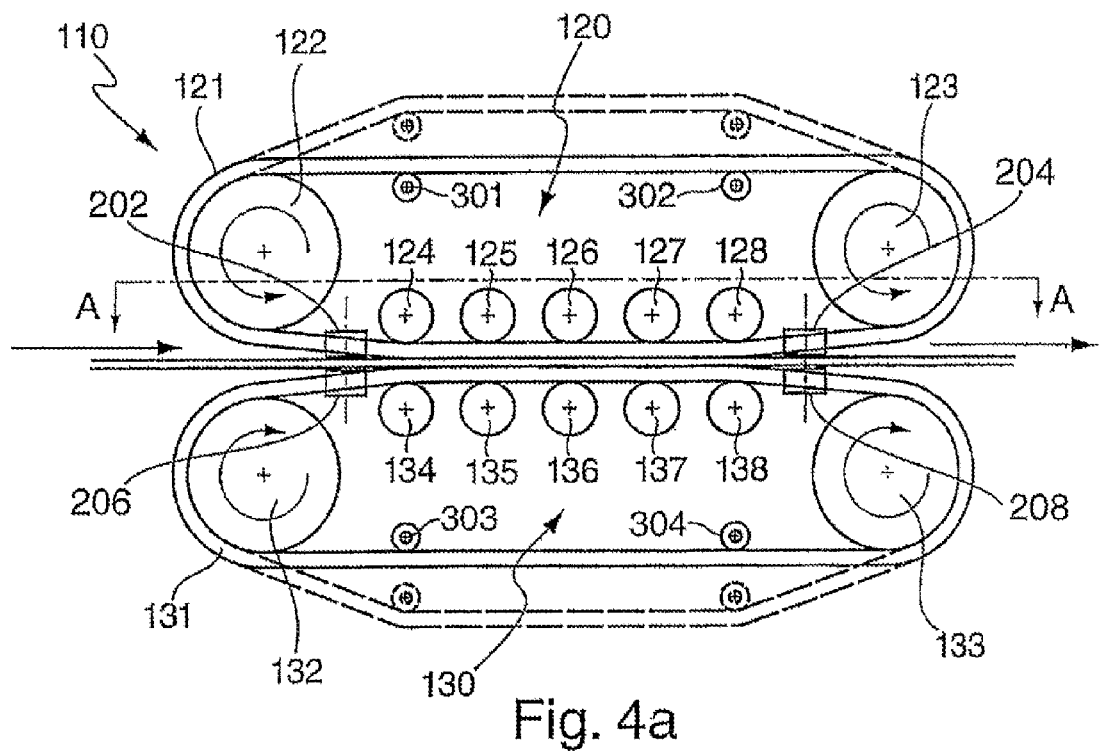
FIG. 4a shows a further alternative embodiment of schematic depiction of a caterpillar traction mechanism according to the present invention.
Figure 4B:
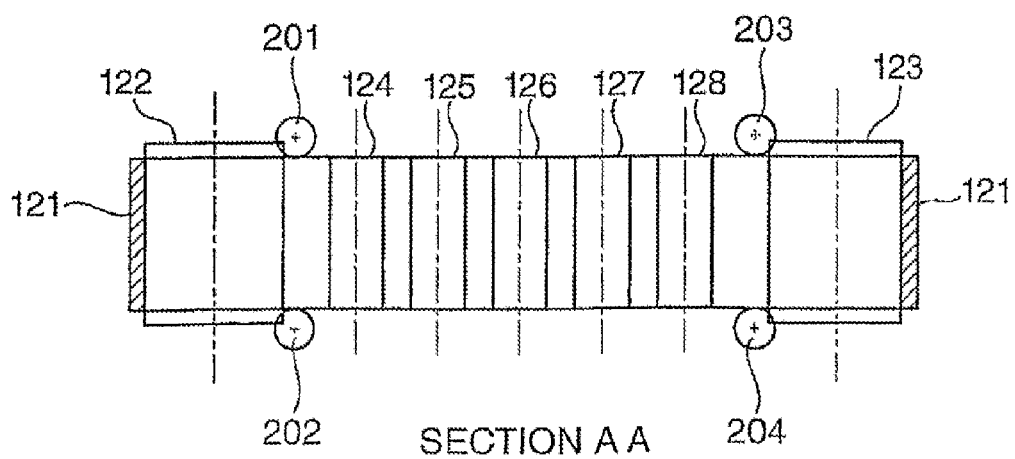

FIG. 4 shows a further embodiment of the present invention in which eight additional guide rollers, six of which are seen at 201, 202, 203, 204, 206 and 208, are provided. Guide rollers 201, 202, 203 and 204 co-operate with the first extensible belt 121 whilst guide rollers 206 and 208 co-operate with the second extensible belt 131. FIG. 4a shows guide rollers 202, 204, 206 and 208 and FIG. 4b, which is a section of FIG. 4a along the line AA, shows guide rollers 201, 202, 203 and 204. Guide rollers (not visible in FIGS. 4a and 4b) are behind guide rollers 206 and 208 respectively in FIG. 4a and beneath guide rollers 201 and 203 respectively in FIG. 4b.

All of the guide rollers 201-208 are free to rotate and act as guides to maintain their respective extensible belts symmetrically positioned on the driven rollers 121, 123 and 131, 133 respectively. When the extensible belts are under compression in the 'interior portion', i.e. the speed differential is such that all of the extensive strain is relieved and compressive stain is now occurring in the belts 121 and 131, they have a tendency to 'snake' across the compression rollers 124-128 and 134-138 respectively. This 'snaking' can lead to the belts drifting off the driven rollers. The addition of the guide rollers 201-208 maintain the position of the extensible belts relative to the compression rollers and the drive rollers. It will be understood that the embodiment of the invention described above with reference to FIG. 4 may be used in conjunction with any of the other embodiments of the invention described above.

It will be understood that rather than moving the second and fourth pulleys to strain the belts, the belts could be provided 'too short' for the distance between the first and third pulleys and the second and fourth pulleys, such that the belts are tensioned by fitting them over their respective pairs of pulleys. However, this alternative method is not preferred due to the increased difficulty of fitting the strained belts over the pulleys.

Furthermore, it is possible to operate the apparatus according to the present invention without pre-straining the belts by moving the pulleys or by using belts that are too short and this is achieved by providing the differential strain in the 'interior portion' and the 'exterior portion' solely by varying the first and second speeds, however it is believed that the tensioning of the belt will require so much energy from the driven pulleys that there will be less energy available to process the linear member being driven through the apparatus and under certain conditions it may not be possible to transfer sufficient energy to the linear member to achieve the desired degree of processing.

It is also believed that the differential speed between the two sets of pulleys can be increased by driving the slower moving set of pulleys in the reverse direction to that described above, however this will lead to significant heat generation and increased wear occurring to the inner surface of the belts. Conventionally, caterpillar machines are arranged to provide maximum drive transfer and to minimise belt slippage, but some features, such as 'multi-vee' drive pulleys and belt profiles, may be altered in order to allow significant slippage to enable one set of pulleys to be driven in reverse without causing any significant problems.

It is a known characteristic of rubber that it is incompressible. Therefore, if an extensible belt comprises a significant proportion of rubber it will be necessary to extend the belt before any compression can be developed within a region of the belt. Furthermore, as the compression is being developed by working against the extension previously generated within the belt, the level of compression that can be developed will be limited by the level of extension present in the belt. Clearly belts could be made with other materials, either in place of or in addition to rubber, such as a foamed polymer, that are capable of being compressed and thus do not need to be extended before compression can be developed in a region of the belt.

The invention claimed is:

1. A method of processing a polymeric tubular member using a mechanical caterpillar apparatus, the apparatus comprising first and second elastically extensible traction members, and first, second, third and fourth rotatable members, both of said traction members having an interior portion and an exterior portion, and each of said rotatable members having an outer drive surface, the method comprising the steps of:

forming the polymeric tubular member such that there is tensile strain energy stored within the polymeric tubular member;

elastically stretching the first traction member around the first and second rotatable members in order to tension both the interior portion and the exterior portion of the first traction member and thereby provide frictional grip between the first traction member and said outer drive surfaces of the first and second rotatable members;

elastically stretching the second traction member around the third and fourth rotatable members in order to tension both the interior portion and the exterior portion of the second traction member and thereby provide frictional grip between the second traction member and said outer drive surfaces of the third and fourth rotatable members, such that the interior portion of each traction member opposes the interior portion of the other traction member;

using a motor connected to each of the rotatable members by a respective drivable connection to drive each of the rotatable members such that the first and third rotatable members are driven by said drivable connections at a first speed and the second and fourth rotatable members are driven by said drivable connections at a second speed, such that the polymeric tubular member is pulled into the opposed interior portions of the first and second traction members between the first and third rotatable members and advanced towards the opposed interior portions of the first and second traction members between the second and fourth rotatable members;

wherein the first speed is not equal to the second speed such that in both of said traction members the tension in one of said portions is reduced owing to elastic compression of said portion and the tension in the other one of said portions is increased owing to elastic extension of said portion, the first traction member being driven by frictional grip with the first and second rotatable members and the second traction member being driven by frictional grip with the third and fourth rotatable members, such that as the polymeric tubular member is advanced between the opposed interior portions of the first and second traction members, the polymeric tubular member is processed by linear compression or by linear extension depending on said speed difference in order to change the tensile strain energy stored within the polymeric tubular member.

2. A method of processing a polymeric tubular member according to claim 1, wherein the difference between the first speed and the second speed linearly compresses the polymeric tubular member in order to reduce the tensile strain energy stored within said polymeric tubular member.

3. A method of processing a polymeric tubular member according to claim 1, wherein the difference between the first speed and the second speed linearly extends the polymeric tubular member in order to increase the tensile strain energy stored within said polymeric tubular member.

4. A method of processing a polymeric tubular member according to claim 1, wherein said rotatable members are substantially cylindrical and both of said traction members have a tread pattern on an inner surface thereof to increase said frictional grip.

* * * * *